United States Patent [19]

Grace

[11] Patent Number: 4,999,831
[45] Date of Patent: Mar. 12, 1991

[54] SYNCHRONOUS QUANTIZED SUBCARRIER MULTIPLEXER FOR DIGITAL TRANSPORT OF VIDEO, VOICE AND DATA

[75] Inventor: Martin K. Grace, Prairie Village, Kans.

[73] Assignee: United Telecommunications, Inc., Shawnee Mission, Kans.

[21] Appl. No.: 423,374

[22] Filed: Oct. 19, 1989

[51] Int. Cl.$^5$ .............................. H04J 4/00; H04J 1/08
[52] U.S. Cl. ...................................... 370/50; 370/69.1;
370/70; 370/76; 370/118; 375/43; 358/15;
358/143; 358/343
[58] Field of Search .................. 370/69.1, 70, 76, 120,
370/50, 3, 118, 110.1; 375/25, 61, 43;
358/11-13, 15, 21 R, 335, 343, 141-143;
455/109; 332/167

[56] References Cited

U.S. PATENT DOCUMENTS

| 4,385,381 | 5/1983 | Alexis | 370/70 |
| 4,388,638 | 6/1983 | Dischert et al. | 358/21 R |
| 4,556,973 | 12/1985 | Uemura | 370/76 |
| 4,704,715 | 11/1987 | Shibagaki et al. | 370/50 |
| 4,849,811 | 7/1989 | Kleinerman | 370/76 |

FOREIGN PATENT DOCUMENTS

| 0187144 | 9/1985 | Japan | 370/3 |
| 8503184 | 7/1985 | World Int. Prop. O. | 358/143 |

OTHER PUBLICATIONS

Donald K. Weaver, Jr., "A Third Method of Generation and Detection of Single-Sideband Signals", Proceeding of the IRE, Dec. 1956, pp. 1703-1705.
Mischa Schwartz, "Information Transmission, Modulation, and Noise", 1970, pp. 117-122.

Primary Examiner—Douglas W. Olms
Assistant Examiner—Alpus H. Hsu

[57] ABSTRACT

This invention addresses the digital transmission of wideband video, narrowband audio, and digital information over information networks. More specifically, the invention involves synchronous quantized subcarrier multiplexing (quantized-SCM) which results in purely electronic multiplexing of voice, data and multiple channel full bandwidth NTSC video for digital transmission over a communcation line and recovery of same signals at a receiving station.

7 Claims, 1 Drawing Sheet

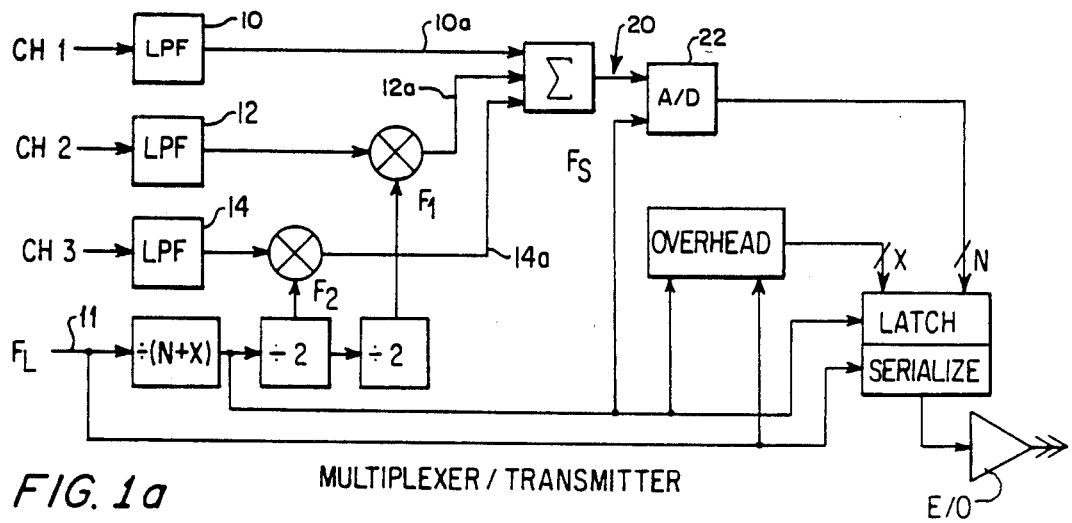
FIG. 1a MULTIPLEXER/TRANSMITTER
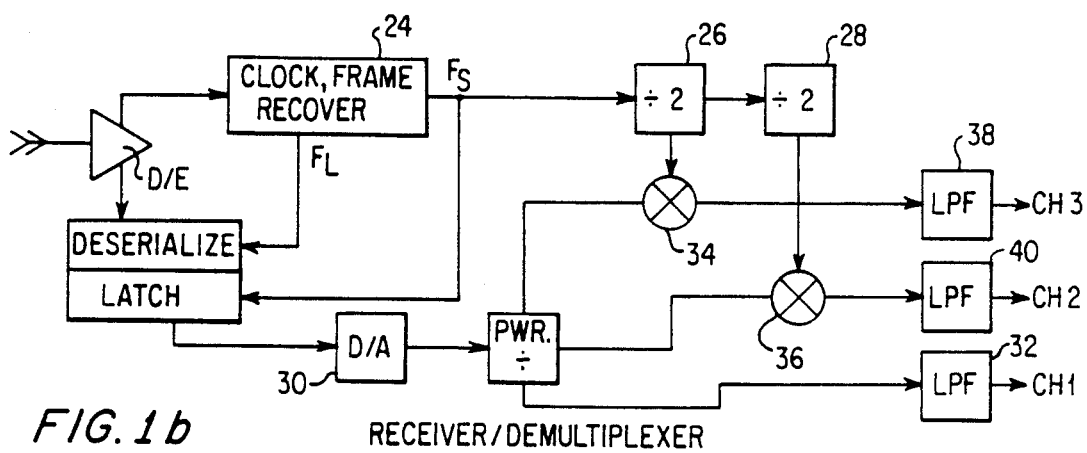
FIG. 1b RECEIVER/DEMULTIPLEXER
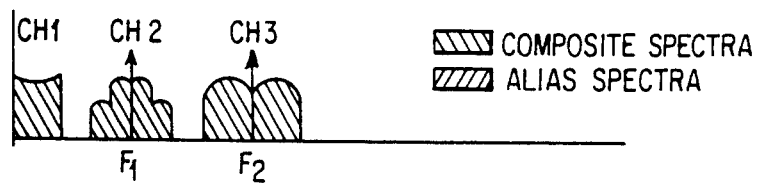
FIG. 2a
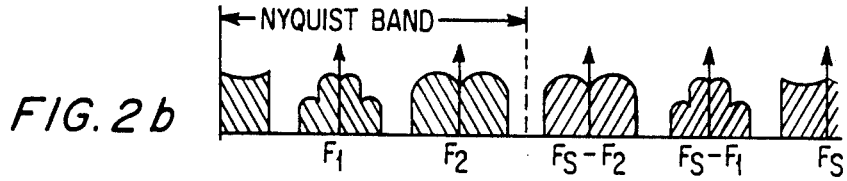
FIG. 2b
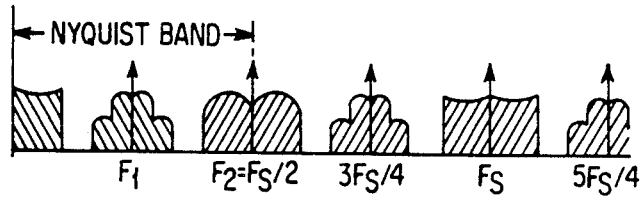
FIG. 2c

1

SYNCHRONOUS QUANTIZED SUBCARRIER MULTIPLEXER FOR DIGITAL TRANSPORT OF VIDEO, VOICE AND DATA

FIELD OF THE INVENTION

This invention relates to the digital transmission of mutichannel video, audio, and/or digital information over optical fiber networks.

BACKGROUND OF THE INVENTION AND PRIOR ART

Presently video information is generated and received as an analog signal of considerable bandwidth and dynamic range, with transmission primarily one way. On the other hand, voice and data information are often transmitted bi-directionally and are digital in form. They usually require much less bandwidth and dynamic range than do multi-channel video signals. This dichotomy has made purely electronic multiplexing of wideband analog video with narrowband voice and digital data signals inherently complex. But, since the preferred method for telephone transmission is digital, once the telephone network service embodies video transmission as part of its offering then video transmission very likely will also be preferred digital.

Several architectures utilize optical wavelength division multiplexing (WDM) to avoid problems of electrically multiplexing wideband analog video with narrowband digital signals. This approach suffers the disadvantage of requiring multiple optical sources and detectors per subscriber, as well as requiring specialized optical coupling components.

Many architectures use analog video transmission through single mode fiber, directly modulating the laser with AM or FM techniques for transmission of several channels of video information to the subscriber. These systems require precise linearity and stabilization of the laser source, and with few exceptions are not very compatible with low cost lasers.

Two conventional schemes exist for multiplexing and digitally transmitting multichannel information over optical fiber networks. The first involves individually digitizing the input channels by assigning an analog-to-digital (A/D) converter to each channel with the resulting digital tributary data being time division multiplexed (TDM) into a high speed digital bit stream. This allows the parameters of each A/D converter to be tailored to the exact requirements of each channel. Thus, the least number of bits can be transmitted for the amount of information present, yielding the maximum bandwidth efficiency. In a second approach, a single A/D converter is timeshared among several analog channels. Analog switches select the appropriate channel, each in turn being digitized. It is difficult to vary the dynamic range and bandwidth resources in the digitizer to efficiently accommodate the requirements of all channels being digitized. Thus, the A/D sample rate and dynamic range must be set according to the worst case channel.

SUMMARY AND OBJECT OF THE INVENTION

The primary objective of the present invention is to electronically combine voice, data and video signals resulting in a single digital signal maintaining all of the information necessary to reconstruct the voice, data and video signals. Ideally, the process is to be independent of specific signal requirements and not hardware intensive. No optical multiplexing is required.

The quantized-SCM system is free from many of the shortcomings of conventional multiplexing and transmission. Unlike TDM systems, only one A/D converter is required regardless of the number of channels present, since a single composite analog waveform is to be digitized. Unlike A/D timesharing systems, none of the complex analog signal processing is required since all of the multichannel information is present at all times within the composite signal. The complexity of the A/D timesharing function is eliminated. In the quantized-SCM method, the dynamic range and sample rate is determined solely by the requirements of the composite waveform. Each individual channel contributes to the composite in a controlled fashion where high dynamic range signals (video signals) are allotted a larger presence in the composite (less attenuation) and lower dynamic range signals (digital signals) are allotted a smaller presence in the composite (more attenuation). By proper assignment of the input channels to a particular frequency range, i.e. properly selecting $F_1$ and $F_2$ the quantized-SCM system can be reasonably efficient in terms of bandwidth allocation and sampling efficiency.

A very significant advantage of the quantized-SCM method is that narrowband digital information is quite easily multiplexed with the wideband video information. The bandwidth limited digital data waveform is simply treated as an analog waveform with a moderate bandwidth requirement and dynamic range, and is simply resampled as part of the composite signal digitization. Thus, narrowband digital information can be incorporated into the transmitted bit stream without regard to defined signal standards or specific signal requirements.

Another significant advantage of the quantized-SCM method relates to the concept of hyper-Nyquist sampling. The Nyquist criteria is discussed within the detailed description of this invention.

DESCRIPTION OF THE DRAWINGS

The accompanying drawings form a part of the specification and are to be read in conjunction therewith and in which like reference numerals are used to indicate like parts in the various views:

FIG. 1 (a) is a block diagram of a quantized-SCM multiplexing transmitter subsystem.

FIG. 1 (b) is a block diagram of a quantized-SCM receiver/demultiplexer subsystem.

FIG. 2 is a signal spectrum of an arbitrary composite signal with three input channels (a) at the digitizer input, (b) at the D/A output with asynchronous sampling and (c) at the D/A output if synchronous sampling is used.

FIGS. 1 (a) and 1 (b), taken together are a block diagram of a simple three channel quantizing subcarrier multiplexer. This invention can accommodate at least two channels (information bearing signals). This description uses three channels as an illustration not as a limitation. Channel 1 is designated the baseband channel, channel 2 the midband channel, and channel 3 the highband channel. Additional channels are possible depending upon the relative bandwidth of signals to be multiplexed, and the method of reference frequency generation.

Each channel to be multiplexed is passed through a separate low pass filter as at 10, 12 and 14 respectively. Low pass filtering eliminates frequency components of a signal that are higher than the particular filter is designed to pass. Eliminating the higher frequencies assures the minimum required bandwidth allocation per channel. Minimizing the bandwidth of each input channel will result in a composite waveform which also has the least bandwidth necessary to carry the required information. Minimizing the composite bandwidth will maximize accuracy and efficiency of the A/D conversion, transmission, reception and D/A conversion. The baseband, midband and highband will have bandwidths after being low pass filtered of $B_0$, $B_1$ and $B_2$ respectively.

After low pass filtering each input channel, the mid and high band channel information is appropriately mixed with local reference frequencies $F_1$ and $F_2$, as at 16 and 18 in FIG. 1 (a). This results in three signals: baseband with a bandwidth of $B_0$ in line 10a, midband with a bandwidth of $B_1$ whose frequency shifted spectrum is centered at $F_1$ in line 12a and a highband with bandwidth $B_2$ whose frequency shifted spectrum is centered at $F_2$ in line 14a. Experimentation has determined that double sideband suppressed carrier (DSBSC) form of amplitude modulation is the most effective means of frequency shifting. The separate spectra of the three signals are then power combined at 2a in FIG. 1 (a) using passive couplers, resulting in a composite analog signal spectrum as indicated by FIG. 2 (a). It should be noted that a special relationship exists between $F_1$ and $F_2$. This relationship is explained later in this description.

To avoid information on one channel from overlapping information of another channel within the composite signal, the following relationship is vital. Frequency $F_2$ is greater than $F_1$ such that $F_2-B_2$ exceeds $F_1+B_1$. Likewise, $F_1-B_1$ must exceed $B_0$. This relationship is demonstrated in FIG. 2 (a).

The composite signal resulting from this application of conventional subcarrier multiplexing (SCM) is acceptable for digitization if the following precautions have been taken:

1. The instantaneous superposition of the baseband and frequency shifted channel signals in the composite never exceeds the input dynamic range of the candidate A/D converter 22 in FIG. 1 (a);
2. The bandwidth information of the composite does not violate the Nyquist criteria; i.e. the A/D sample rate $F_S$ is equal to or greater than 2 $F_{max}$, where $F_{max}$ is the highest desirable frequency component of the composite signal.
3. The number of quantization levels of the candidate A/D converter is sufficient to resolve the composite signal with adequate integrity so that individual channel recovery can be performed without excessive noise degradation.

Assuming the above precautions have been accounted for, the composite signal enters an analog-to-digital converter (A/D) 22, and the process of transmitting this signal begins. Between the multiplexer/transmitter and the receiver/demultiplexer the information exists in digital form. This allows the possibility of direct digital transmission.

A uniform characteristic A/D converter has a resolution of N bits resulting in $2^N=M$ quantization levels. Most communication systems require the addition of a certain number of overhead bits for framing and synchronization, designated X. This allows the most significant bit (MSB) to be identified in each frame of the eventual serialized bit stream. Calling the number of overhead bits X, a simple relationship between the line transmission rate $F_L$ and $F_S$ results when: $F_L=F_S(N+X)$ bits/sec.

As shown in FIG. 1 (b), once the incoming bit stream is clock and frame recovered as at 24, the frame rate $F_S$ is simply divided again as at 26 and 28 to yield $F_2$ and $F_1$. Assuming adequate BER transmission at the line rate and suitably low jitter on the recovered clock, the resulting reference frequencies $F_1$ and $F_2$ recovered in the receiver/demultiplexer are synchronous with their counterparts in the transmitter/multiplexer.

Having properly controlled the sampling rate, Nyquist criteria, and line data rate, the process of recovering the information stored on the composite signal is a reversal of the multiplexing process. The digital data is digital-to-analog converted as at 30, yielding the composite signal in analog form. The frequency shifted channels are then demultiplexed, and the composite signal results in the three original separate channels. The baseband channel information is recovered with simple low pass filtering as at 32. The frequency shifted channels are recoverable with synchronous homodyne detection as at 34 and 36 for channel 3 and channel 2 respectively, and low pass filtering 38 and 40.

To assure accurate reconstruction (from digital to analog) of the composite signal in the receiver/demultiplexer, the rate at which the composite signal is sampled in the multiplexer/transmitter must be carefully controlled. If the Nyquist criteria is not accounted for, improper aliasing may occur which will distort the reconstructed composite signal.

A significant advantage of the quantized-SCM method relates to the concept of hyper-Nyquist sampling. This condition occurs when a band limited signal whose highest frequency component $F_B$ is sampled at a rate $F_S$ such that $F_S \geq 2F_B$. In the quantized-SCM system, all of the channels are efficiently sampled at the sample rate $F_S$ as it relates to the composite signal, and $F_S$ is much higher than the Nyquist sample rate for any individual channel. If a simple relationship exists between $F_S$ and the subcarrier frequencies $F_1$ and $F_2$ and if proper phase relationships are maintained (if the modulated carriers are always sampled at their most positive and negative excursions) the envelope information in the mid and high band channels are effectively sampled at $F_S$. If the hyper-Nyquist criteria exists for the largest bandwidth signal present in the composite signal, it exists for all channels in the quantized-SCM system.

A further advantage of the quantized-SCM system is attained by synchronously sampling the high band channel $F_2$ of the composite signal exactly at the Nyquist rate: $F_S=2F_2$. From FIG. 2 (a), it appears that the upper sideband of the DSBSC spectrum of the high band channel would not be properly encoded if sampled at $F_S=2F_2$. For a signal of bandwidth $B_2$ and frequency shifted to a center frequency $F_2$, the maximum frequency excursion of the upper side band would be $F_2+B_2$. It would seem that the minimum necessary Nyquist sample rate to properly encode the high band channel is $F_S=2(F_2+B_2)$ (asynchronous sampling, FIG. 2 (b)). This is not the case with the quantized-SCM system. When sampling the composite exactly at a rate of $F_S=2F_2$, the lower sideband of the DSBSC spectrum of the high band channel is properly sampled, and the envelope signal is adequately encoded. The information stored between $F_2$ and $F_2+B_2$ is identical, with reverse spectrum, as the information stored between $F_2-B_2$ and $F_2$. Therefore, the upper sideband of the high band channel is effectively aliased upon the lower sideband, and no overlap or distortion arises, illustrated in FIG. 2 (c). If synchronous sampling ($F_S=2F_2$) can be achieved, sampling at a rate higher than $F_S=2F_2$ is unnecessary for preservation of the highband information. Thus, for asynchronous sampled systems, $F_{max}=F_2+B_2$. For synchronous sampled systems, $F_{max}=F_2$.

If $F_S=2F_2=4F_1$, then the transmitted signals are synchronous with the sampling frequency. This derives the name "synchronous quantizing subcarrier multiplexer." The synchronous condition is advantageous for proper operation of quantized-SCM systems, since it results in greatly improved bandwidth efficiency over asynchronous sampled systems. Yet it implies that the subcarriers $F_1$ and $F_2$ as well as the sampling signal $F_S$ must all be derived from a source signal common to both the multiplexer/transmitter and receiver/demultiplexer ends of the system. This requires that a relationship must exist between $F_S$ and the line data rate $F_L$, 11. This condition can be met by deriving $F_S$, $F_1$, and $F_2$ with digital prescaler elements (flip flops) when they are initially generated in the transmitter/multiplexer.

Having thus described my invention I claim:

1. A method of transmitting at least two information bearing signals over a communication link comprising the steps of
   a. mixing a first signal having a bandwidth $B_1$ with a local carrier signal having a frequency $F_1$;
   b. mixing a second signal having a bandwidth $B_2$ with a second local carrier signal having a frequency $F_2$ which is greater than $F_1$ such that $F_2-B_2$ exceeds $F_1+B_1$;
   c. multiplexing the carriers to form a composite signal;
   d. synchronously sampling the composite signal at a sampling rate $F_S$ where $F_S$ is equal to 2 times $F_2$ and converting the composite signal to a digital signal representative thereof;
   e. applying said digital signal to the communication link;
   f. receiving said digital signal at a receiver connected with said link in a manner such that $F_S$ is recoverable at the receiver and converting said digital signal to a reconstructed composite signal substantially identical to the first named composite signal; and
   g. recovering the first and second signals from said reconstructed signal.

2. A method as in claim 1, including the steps of:
   generating a base band analog signal having a bandwidth $B_0$ such that $B_0$ is less than $F_1-B_1$;
   multiplexing said base band signal with said carriers; and
   recovering said base band signal from said reconstructed composite signal.

3. The method as in claim 2, wherein said base band signal is recovered by low pass filtering.

4. A method of transmitting at least two information bearing signals over a communication link comprising the steps of:
   a. accepting a baseband signal having bandwidth $B_0$;
   b. accepting a second signal with bandwidth $B_1$ and mixing it with a local carrier signal having a frequency of $F_1$, where $F_1-B_1$ exceeding $B_0$;
   c. accepting additional signals with bandwidth $B_n$ and mixing it (them) with local carrier signal(s) having frequency of $F_n$, where $F_n$ is the maximum carrier frequency, $B_n$ is the maximum bandwidth and n is an integer greater than or equal to 1, where $F_n$ is greater than $F(n-1)$ such that $(F_n-B_n)$ exceeds $(F(n-1)+B(n-1))$;
   d. multiplexing the signals with bandwidth $B_0$ through $B_n$ to form a composite signal;
   e. synchronously sampling the composite signal at a sampling rate $F_S$ where $F_S$ is equal to 2 times $F_n$ and converting the composite signal to a digital signal representative thereof;
   f. applying said digital signal to the communication link;
   g. assuring the line data rate of transmission $F_L=F_S(N+X)$ bits/sec. where N is the bit resolution of a uniform characteristic A/D converter resulting in a $2^n=M$ quantization levels, and where X equals the number of overhead bits required for framing and synchronization;
   h. receiving said digital signal at a receiver connected with said link in a manner such that $F_S$ is recoverable at the receiver and converting said digital signal to a reconstructed analog composite signal substantially identical to the first named composite signal.

5. A method as in claim 4, including the steps of:
   a. Demultiplexing said reconstructed composite signal resulting in the same number of separate information bearing signals as were present prior to multiplexing;
   b. Each signal containing substantially identical information as its corresponding original signal.

6. A method as in claim 5, wherein said information contained on said baseband signal is recovered by low pass filtering.

7. A method as in claim 5, wherein said information contained on said signals with bandwidth $B_1$, through $B_n$ are recovered using homodyne detection and low pass filtering technique on each of the remaining signals.

* * * * *